(12) United States Patent
Ferrazza et al.

(10) Patent No.: US 9,948,188 B2
(45) Date of Patent: Apr. 17, 2018

(54) CONTROL DEVICE FOR A QUASI-RESONANT SWITCHING CONVERTER, AND CORRESPONDING CONTROL METHOD

(71) Applicant: STMICROELECTRONICS S.R.L., Agrate Brianza (IT)

(72) Inventors: Francesco Ferrazza, Milan (IT); Davide Lena, Taibon (IT); Mirko Gravati, Genoa (IT); Domenico Tripodi, Milan (IT); Massimiliano Leggenda, Voghera (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 254 days.

(21) Appl. No.: 14/829,398

(22) Filed: Aug. 18, 2015

(65) Prior Publication Data
US 2016/0126846 A1    May 5, 2016

(30) Foreign Application Priority Data

Nov. 4, 2014 (IT) .............................. TO2014A0912

(51) Int. Cl.
*H02M 7/217* (2006.01)
*H02M 3/335* (2006.01)
(Continued)

(52) U.S. Cl.
CPC ... *H02M 3/33507* (2013.01); *H02M 3/33523* (2013.01); *H02M 2001/0058* (2013.01); *Y02B 70/1433* (2013.01); *Y02B 70/1491* (2013.01)

(58) Field of Classification Search
CPC ......... H02M 3/33523; H02M 3/33538; H02M 3/33507; H02M 2001/0054; H02M 2001/0058; Y02B 70/1425; Y02B 70/1433
(Continued)

(56) References Cited

U.S. PATENT DOCUMENTS 4,964,028 A * 10/1990 Spataro ............. H02M 3/33507
363/21.12
6,061,257 A * 5/2000 Spampinato ...... H02M 3/33523
363/21.13
(Continued)

FOREIGN PATENT DOCUMENTS

CN   101312330 A   11/2008
CN   201869102 U   6/2011
JP   5217808 B2    6/2013

OTHER PUBLICATIONS

Richtek Technology Corporation, "Primary-Side-Regulation LED Driver Controller with Active PFC", RT7304, Sep. 2013, 14 pages.

*Primary Examiner* — Jue Zhang
*Assistant Examiner* — Jye-June Lee
(74) *Attorney, Agent, or Firm* — Seed IP Law Group LLP

(57) ABSTRACT

A control device for a switching converter having a transformer, with a primary winding receiving an input quantity, a secondary winding providing an output quantity, an auxiliary winding providing a feedback quantity, and a switch element. The control device has a processing module for generating a control signal for switching the switch element on the basis of the feedback quantity in order to regulate the output quantity via alternation of phases of storage and transfer of energy. The processing module controls the end of the transfer phase by comparing the feedback quantity with a comparison threshold. A discrimination circuit generates a signal for discrimination between the presence of a
(Continued)

short circuit on the output or the fact that the input quantity is lower than a threshold. The processing module controls the end of the energy-transfer phase also on the basis of the discrimination signal.

19 Claims, 11 Drawing Sheets

(51) Int. Cl.
    *H02M 1/08*     (2006.01)
    *H02M 1/00*     (2006.01)

(58) Field of Classification Search
    USPC ......... 363/21.01, 21.02, 21.03, 21.12, 21.15, 363/21.16
    See application file for complete search history.

(56) References Cited

U.S. PATENT DOCUMENTS

| | | | |
|---|---|---|---|
| 6,087,782 A * | 7/2000 | Majid | H02M 3/33538 363/16 |
| 7,848,124 B2 * | 12/2010 | Choi | H02M 3/33523 363/56.1 |
| 9,042,127 B2 | 5/2015 | Gong | |
| 2009/0086513 A1 | 4/2009 | Lombardo et al. | |
| 2010/0061129 A1 | 3/2010 | Fujii | |

\* cited by examiner

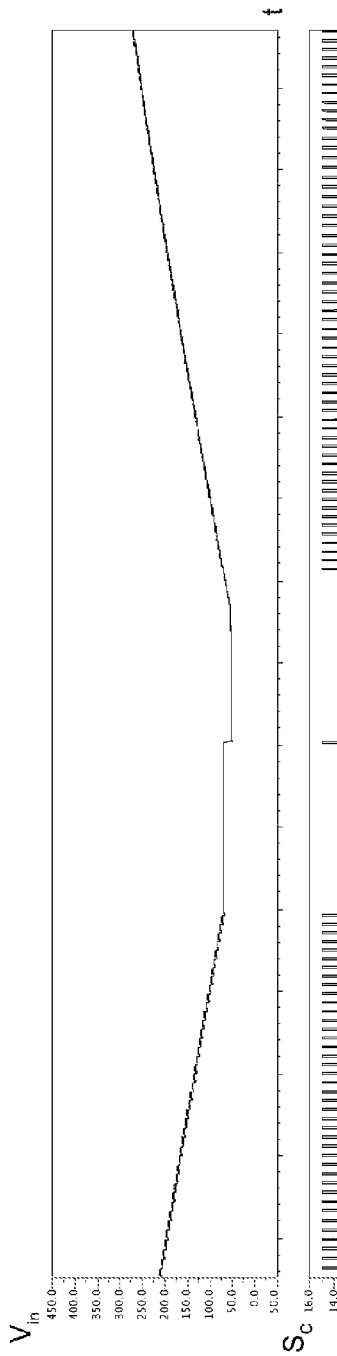
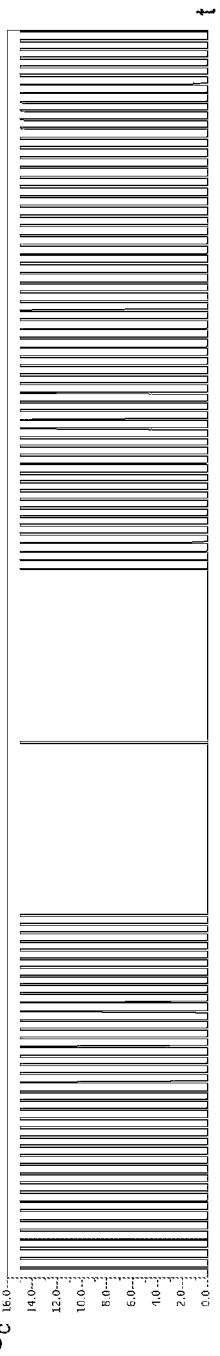
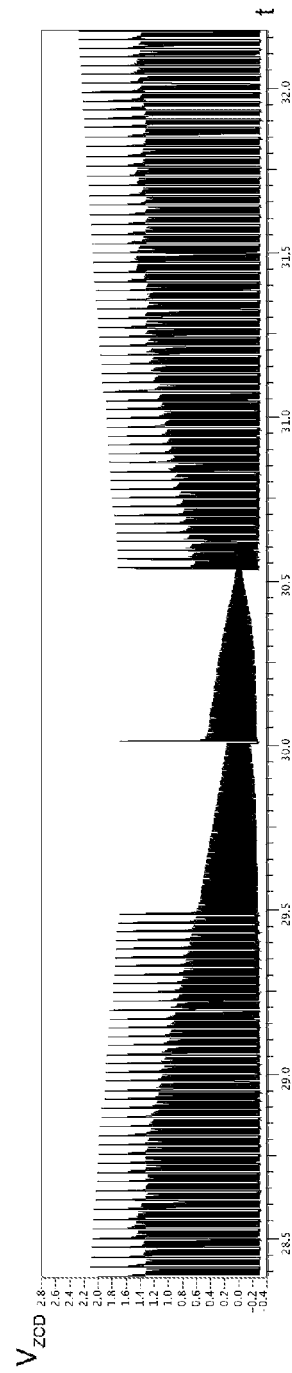
FIG. 5A (Background Art)
FIG. 5B (Background Art)
FIG. 5C (Background Art)

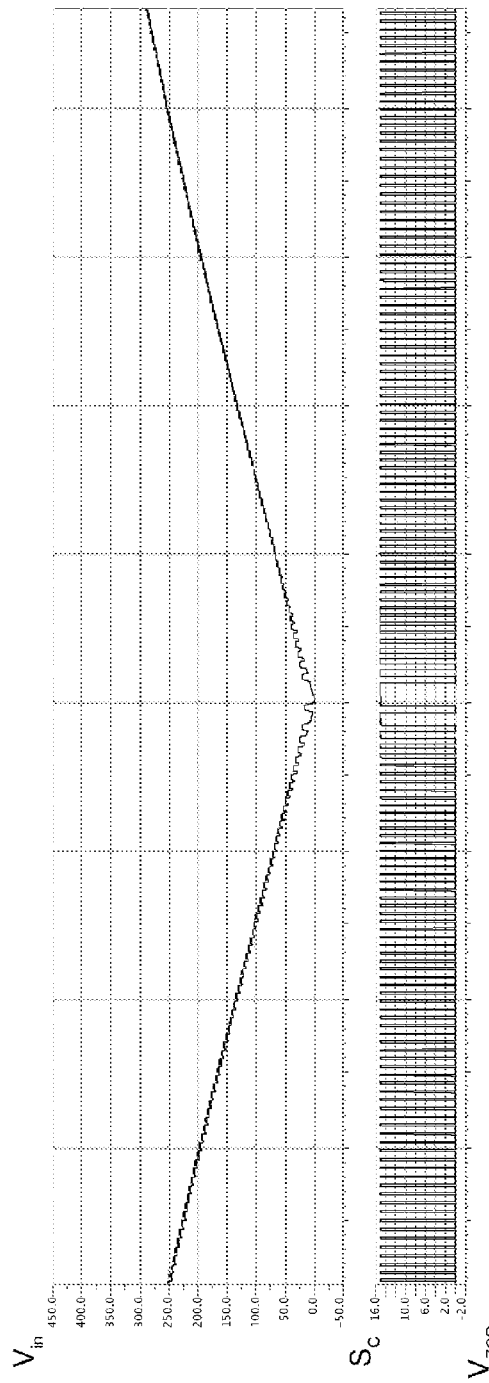
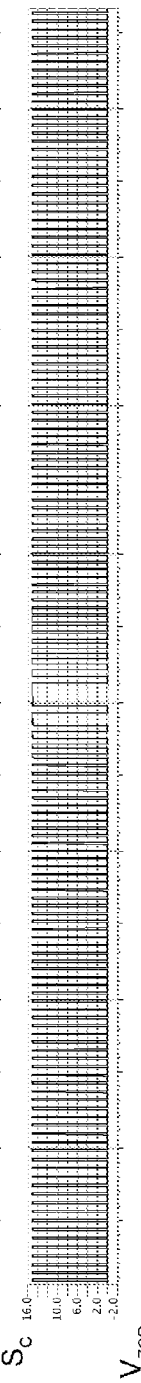
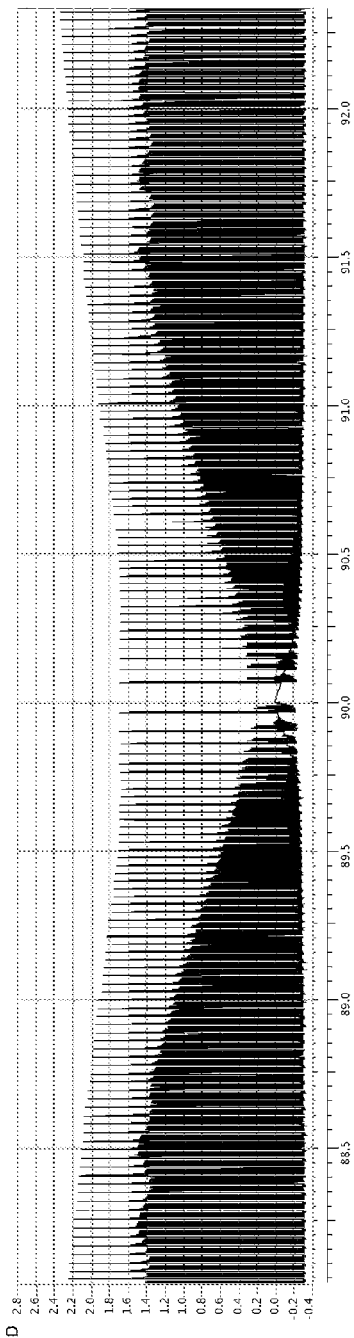
FIG. 13A
FIG. 13B
FIG. 13C

CONTROL DEVICE FOR A QUASI-RESONANT SWITCHING CONVERTER, AND CORRESPONDING CONTROL METHOD

BACKGROUND

Technical Field

The present disclosure relates to control devices for quasi-resonant switching converters; and further to corresponding control methods.

Description of the Related Art

Power switching converters (also called "switching regulators") are known, which are designed to convert a quantity received at input, for example an AC voltage coming from the electrical network, into a regulated output quantity, for example a DC voltage.

Such converters are generally required to meet stringent requirements as regards the corresponding electrical performance, for example, to guarantee a high quality factor, or a substantially unitary power factor.

A control mode that has proven effective is the quasi-resonant mode; FIG. 1 illustrates by way of example the configuration of a flyback converter. It is emphasized, however, that what follows also applies to different types of converters, for example those of a buck-boost type.

The converter, designated as a whole by 1, comprises a transformer 2, having a primary winding 2a, a secondary winding 2b, and an auxiliary winding 2c.

The primary winding 2a has a first terminal 2a' connected to a supply line 3, for example to the electrical mains supplying an AC line voltage $V_{AC}$, through a rectifier stage 4 that provides an input voltage $V_{in}$, and a second terminal 2a" connected to a switch element 5, for example a MOSFET.

The switch element 5 has a first current-conduction terminal, in particular the drain terminal of the respective MOSFET, connected to the aforesaid second terminal 2a" of the primary winding 2a, and a second current-conduction terminal, in particular the source terminal of the respective MOSFET, connected to a first reference terminal (ground, GND), through a detection resistor 6.

The switch element 5 and the detection resistor 6 define between them a first feedback node $FB_1$, providing a first feedback voltage $V_{CS}$, which is a function of the current flowing through the primary winding of the transformer 2.

The secondary winding 2b has a respective first terminal 2b' connected to a first output terminal $Out_1$, via a diode element 7 (having its anode connected to the same first terminal 2b' and its cathode connected to the first output terminal $Out_1$), and a respective second terminal 2b" connected to a second output terminal $Out_2$. A charge-storage element 8 is connected between the first and second output terminals $Out_1$, $Out_2$, in particular a capacitor, on which an output voltage $V_{out}$ is present, for example a DC voltage.

The auxiliary winding 2c has a respective first terminal 2c' and a respective second terminal 2c" connected to a resistive divider formed by a first division resistor 9a and by a second division resistor 9b, defining between them a second feedback node $FB_2$, on which a second feedback voltage $V_{ZCD}$ is present.

The converter 1 further comprises a control device 10 (also defined as "controller"), which, on the basis of the first and second feedback voltages $V_{CS}$, $V_{ZCD}$, received on respective input pins, controls in pulse-width modulation (PWM) opening and closing of the switch element 5, via a control signal $S_c$ provided to the gate terminal of the corresponding MOSFET.

In detail, the control device 10 implements management of the switch element 5 in a quasi-resonant mode with peak-current control, which envisages two distinct phases that follow one another cyclically:

1) an energy-storage phase, during which the switch element 5 is closed (the corresponding MOSFET is on, 'ON' interval of the duty cycle) so as to store energy in the primary winding 2a of the transformer 2, with the diode element 7 preventing the current in the secondary winding 2b from reaching an output load (here not represented). This step terminates (triggering the subsequent energy-transfer step) when the first feedback voltage $V_{CS}$ reaches a threshold defined by a closed control loop (based upon a peak-current control); and 2) an energy-transfer phase, during which the switch element 5 is open (the corresponding MOSFET is off, 'OFF' interval of the duty cycle), so as to transfer the energy previously stored in the primary winding 2a of the transformer 2 to the secondary winding 2b and the load connected at the output. Completion of energy transfer is signaled by onset of a condition of resonance on the primary of the transformer 2, on account of the capacitance present on the drain terminal of the MOSFET of the switch element 5. This phase terminates (once again triggering the energy-storage phase) when the second feedback voltage $V_{ZCD}$ drops below a lower threshold close to zero. This control is defined as "zero-current detection" (ZCD) control.

In greater detail, and as illustrated in FIG. 2, closing of the switch element 5 (determined by the control signal $S_c$, which is also represented in FIG. 2) is based upon a peak-current control mode. The current that circulates in the primary of the transformer 2 (designated by $I_P$ in FIG. 2) is compared with a sinusoidal reference current, in phase with the line voltage $V_{AC}$, generated by the closed control loop for determining the instant of opening of the switch element 5 (and of turning-off of the corresponding MOSFET).

The envelope of the peaks $I_{PK}$ of the primary current $I_P$ has a sinusoidal waveform, whereas the current effectively absorbed by the line, designated by $I_L$, represents the mean value of the same primary current $I_P$. This current $I_L$ is practically sinusoidal and in phase with the line voltage $V_{AC}$, thus enabling a desired correction of the power factor.

In order to implement the quasi-resonant control mode, the switch element 5 is closed (and the corresponding MOSFET is turned on) at a minimum of the resonant oscillation present on the drain voltage of the corresponding MOSFET, when the transformer 2 completes energy transfer to the secondary winding (reaching a demagnetization condition). It has indeed been shown that the switching losses are markedly reduced if turning-on of the MOSFET occurs when the drain voltage is minimum or close to zero.

FIG. 3 shows the drain voltage, the gate voltage, coinciding with the control signal $S_c$, and also the second feedback voltage $V_{ZCD}$. In order to highlight the oscillation, the figure shows the waveforms that these voltages would assume, in the case where the switch element 5 were not closed again in order to implement the quasi-resonant operation described previously.

As highlighted in FIG. 3, the drain voltage, upon turning-off of the MOSFET (upon opening of the switch element 5), increases from a substantially zero value up to a value substantially equal to the sum of the input voltage $V_{in}$ and a voltage $V_R$, which corresponds to the output voltage $V_{out}$ fed back onto the primary (i.e., multiplied by the ratio of the turns between the primary and secondary windings 2a, 2b of the transformer 2), which it reaches after a settling interval during which oscillations due to the leakage inductances of the transformer 2 occur.

Next, when the energy transfer is completed, the drain voltage starts to oscillate in a resonance condition, with an amplitude of the oscillation equal to $V_{in}+V_R$, with a mean value equal to $V_{in}$.

To establish the instant of turning-on of the MOSFET, the control device 10 uses the second feedback voltage $V_{ZCD}$, which is a function of the auxiliary voltage $V_{aux}$. When the current on the secondary of the transformer 2 goes to zero, the voltage on the diode element 7 is zero, so that the voltage on the secondary winding 2b (and consequently an auxiliary voltage $V_{aux}$ across auxiliary winding 2c) is proportional to the output voltage $V_{out}$.

The control device 10 is thus configured for detection of the "valleys" of the second feedback voltage $V_{ZCD}$, when, that is, the second feedback voltage $V_{ZCD}$ drops below a lower threshold, or reaches a substantially zero value.

In detail, with reference to FIG. 4, the control device 10 is configured to analyze the plot of the second feedback voltage $V_{ZCD}$, obtained starting from the aforesaid auxiliary voltage $V_{aux}$ by the resistive divider formed by the division resistors 9a, 9b.

The control device 10 compares, in a comparator, the value of the second feedback voltage $V_{ZCD}$ with a first threshold $Th_1$, referred to as an "arming threshold". When the second feedback voltage $V_{ZCD}$ exceeds the first threshold $Th_1$, an arming signal ARM is switched, for example to the high logic value, and the comparator is enabled for a subsequent comparison between the same second feedback voltage $V_{ZCD}$ and a second threshold $Th_2$, referred to as "trigger threshold", of a value lower than the first threshold $Th_1$ and close to zero.

When the second feedback voltage $V_{ZCD}$ drops below the aforesaid second threshold $Th_2$, a trigger signal TRIG is switched, for example to the high logic value, and the control device 10 detects a condition indicating occurrence of a valley of the auxiliary voltage $V_{aux}$, and thus indicating that demagnetization has occurred, thus determining closing of the switch element 5.

Crossings of the second threshold $Th_2$ that occur during a blanking interval, designated by $T_{blank}$, of a preset minimum value starting from opening of the switch element 5, are not considered, in order to prevent spurious oscillations on the auxiliary voltage $V_{aux}$ from possibly causing false detections.

In FIG. 4, detection of the valley, which causes closing again of the switch element 5 (and the end of the 'OFF' interval of the PWM control signal $S_e$), occurs after a detection time interval, designated by $T_{ZCD}$, starting from the previous opening of the switch element 5.

Even though the converter 1 has generally good electrical performance, the performance is not optimized, at least as regards certain operating conditions.

BRIEF SUMMARY

Embodiments of the present disclosure improve quasi-resonant switching converter operation in order to improve the corresponding electrical performance.

Embodiments of the present disclosure are directed to a device for controlling a converter, a corresponding converter, and a corresponding control method.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, in which:

FIGS. 5A-5C show further plots of electrical quantities associated to the converter of FIG. 1;

FIGS. 13A-13C show plots of electrical quantities associated to the converter according to the present disclosure.

DETAILED DESCRIPTION

Figure 1:
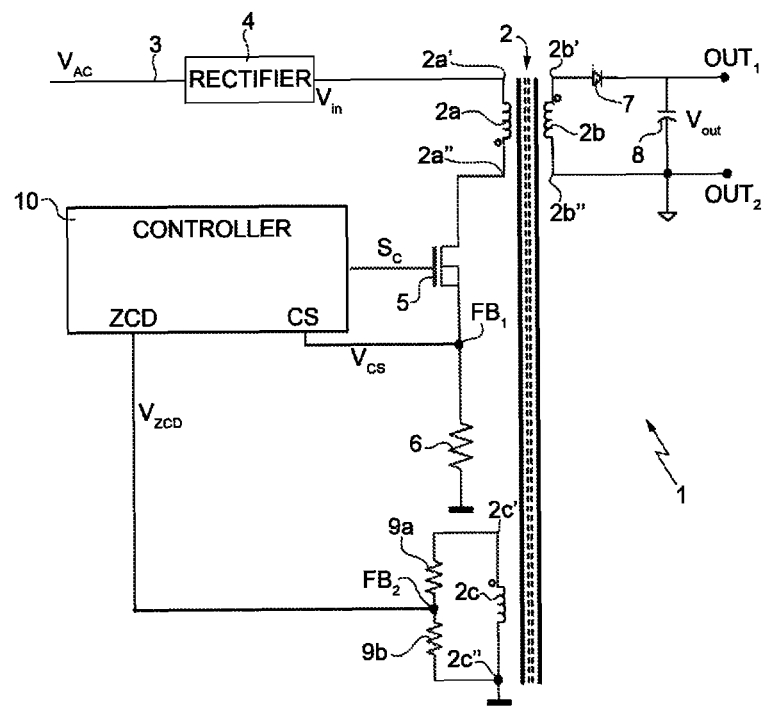
FIG. 1 shows a simplified circuit diagram of a quasi-resonant switching converter.
Figure 2:
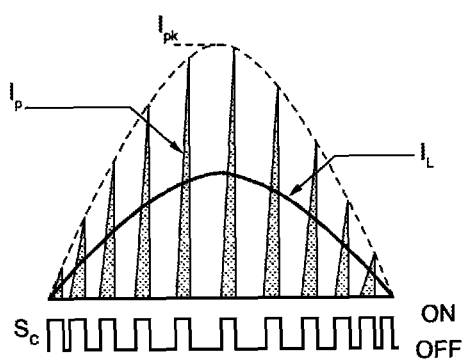
FIGS. 2-4 show plots of electrical quantities associated to the converter of FIG. 1.
Figure 3:
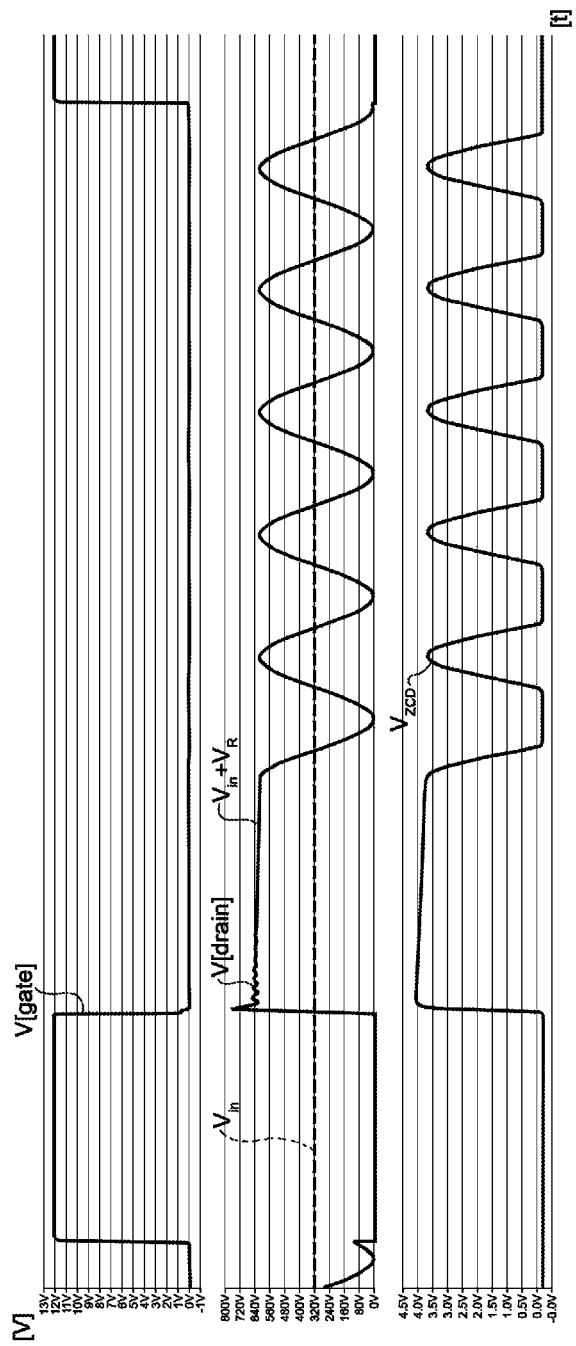

As mentioned previously, the known solutions of quasi-resonant power switching converters (for example, the converter 1 of FIG. 1, to which reference will once again be made in what follows, purely by way of non-limiting example) have some drawbacks, in certain operating conditions, during which the quasi-resonant control described previously does not enable the desired performance and/or may cause errors or malfunctioning.

In the first place, it is possible to show that the aforementioned detection interval $T_{ZCD}$ depends on the peak value of the current $I_S$ that flows in the secondary winding 2b of the transformer 2 (having inductance $L_{sec}$) and upon the output voltage $V_{out}$, according to the following expression:

$$T_{ZCD} = \frac{L_{sec} \cdot I_s}{V_{out}}$$

The maximum value of the current $I_S$ is proportional to the power transferred from the primary winding 2a to the secondary winding 2b of the transformer 2, whereas the envelope of the peaks of the same current $I_S$ is sinusoidal, like the primary current $I_P$.

Consequently, the duration of the detection interval $T_{ZCD}$ varies as the input voltage $V_{in}$ varies, having a maximum value at the peaks of the input voltage $V_{in}$ and a minimum value, ideally zero, at the zero-crossing of the line voltage $V_{AC}$ (or, likewise, upon the input voltage $V_{in}$ reaching a substantially zero value).

Figure 4:
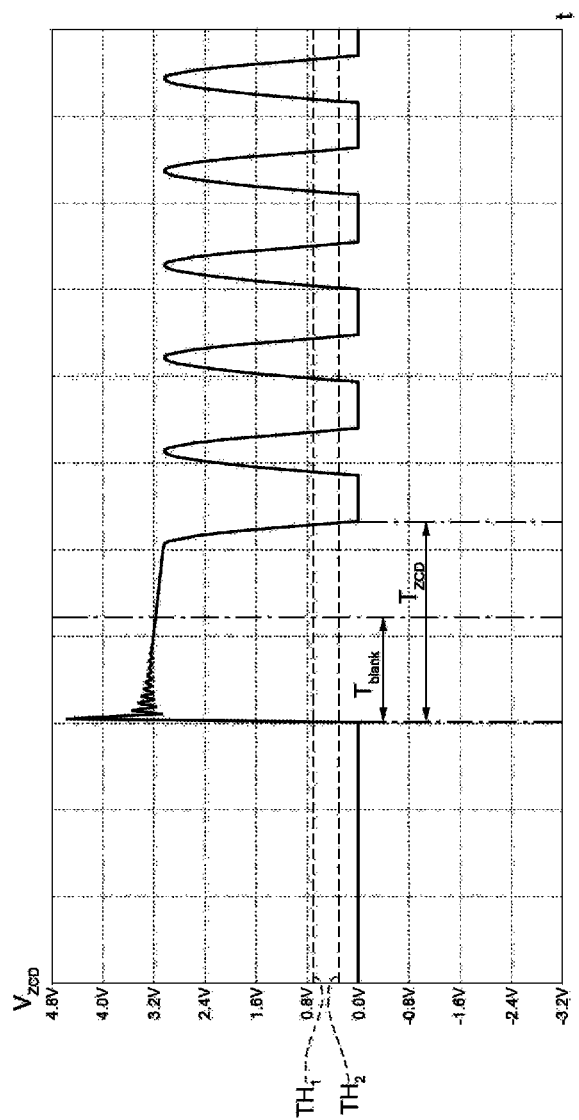

In this operating condition, as will be clear from what has been discussed previously with reference to FIG. 4, the short duration of the detection interval $T_{ZCD}$ may be masked by the blanking interval $T_{blank}$, so that no trigger is generated for closing the switch element 5.

To overcome the above drawback, some known solutions envisage generation of an artificial trigger event, after a preset time interval, having a rather long duration, comprised, for example, between 500 microseconds (μs) and 2 milliseconds (ms). The aforesaid solution entails a considerable distortion of the input current and a considerable deterioration of the value of the parameters of total harmonic distortion (THD) and of power factor (PF) of the converter.

In this regard, FIGS. 5A-5C show the plots, respectively, of the input voltage $V_{in}$, of the control signal $S_c$, and of the second feedback voltage $V_{ZCD}$, at a zero-crossing of the line voltage $V_{AC}$, clearly highlighting the distortion of the waveforms that occurs in known control solutions.

In general, at the zero-crossings of the line voltage $V_{AC}$ (which, in the case of an AC voltage at the frequency of 50 Hz occur every 10 ms), the comparator arming and triggering mechanism implemented by the control device of the converter does not enable correct detection of the valleys or switching of the switch element. Consequently, a time interval exists, in which no switching activity is carried out, power is not transferred at the output, and no current is absorbed from the supply line, with consequent generation of distortions, reduction of the PF, and increase of the THD factor.

In the case where a short circuit occurs at the output of the converter (for example, in the case where the load of the circuit is damaged, thus setting the output terminals $Out_1$, $Out_2$ in direct connection), the amplitude of the second feedback voltage $V_{ZCD}$ is too low to arm and trigger the comparator (given that it is lower than the first threshold $Th_1$ and/or the second threshold $Th_2$), thus generating an effect substantially similar to the one associated with the zero-crossings of the line voltage $V_{AC}$.

In the same operating condition, the high-frequency parasitic oscillations caused by the leakage inductance of the transformer 2 have a long duration, which may be longer than the blanking interval $T_{blank}$. These oscillations may thus arm and trigger the comparator, erroneously. Consequently, the switch element 5 may initiate a very high frequency switching, causing an intense, continuous, magnetization flux in the transformer 2, which may even cause saturation.

In the same operating condition, the diode element 7 may undergo damage, even to the point of failure.

Further operating conditions exist, for example low-load conditions, in which the duration of the blanking interval $T_{blank}$ is appropriately selected with the aim of increasing the voltage-regulation efficiency. This duration may, consequently, even be longer than the detection interval $T_{ZCD}$, once again causing a missed triggering of the comparator.

Also in this condition, known solutions envisage generation of an artificial trigger signal, at a very low repetition frequency, but this causes a reduction of the energy supplied at the output and an intense ripple on the voltage, or current, supplied.

Figure 6:
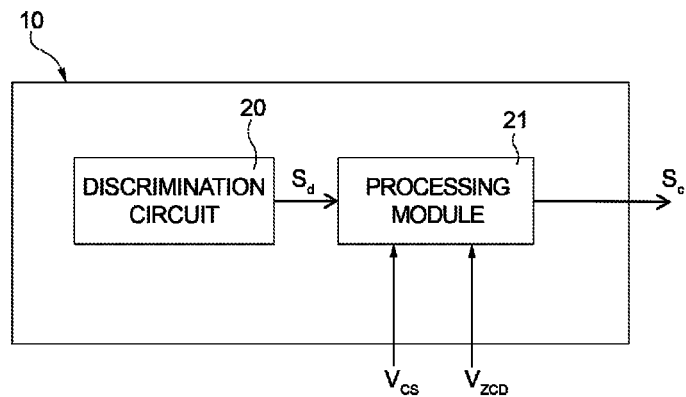
FIG. 6 shows a simplified block diagram of a control device of the converter of FIG. 1, according to an aspect of the present disclosure.

In order to solve the problems highlighted above, one aspect of the present disclosure envisages (see FIG. 6) that the control device, designated once again by 10, of the converter (for example, the converter 1 described with reference to FIG. 1, to which reference is here made, and which is not described again for reasons of brevity), comprises a discrimination circuit 20 and a processing module 21, for example including a microprocessor, a microcontroller, an FPGA, or a similar digital computing module, operatively coupled to the same discrimination circuit 20.

In a known manner, processing module 21 is further provided with an appropriate nonvolatile memory (not shown in FIG. 6), for example of a RAM type, in which information and control programs may be stored (for implementation of appropriate control strategies, as discussed in detail in what follows), for example in the form of a firmware.

In detail, the processing module 21 receives at its input the first and second feedback signals $V_{CS}$, $V_{ZCD}$ (see the foregoing discussion), on the basis of which it implements a control logic for generation of the control signal $S_c$ for controlling switching of the switch element 5 (here not illustrated).

Furthermore, the processing module 21 receives a discrimination signal $S_d$ from the discrimination circuit 20 and is configured to generate the control signal $S_c$ also on the basis of the discrimination signal $S_d$.

The discrimination circuit 20 (see also FIG. 7) has a first input that receives a division voltage $V_p$, deriving from a division of the input voltage $V_{in}$, by a resistive divider defined by a first division resistor 23a and a second division resistor 23b. In particular, a first input of the discrimination circuit 20 is connected to a division node $N_p$, arranged between the first and second division resistors 23a, 23b. The division voltage $V_p$ is thus proportional to the input voltage $V_{in}$, and, consequently, to the line voltage $V_{AC}$.

The discrimination circuit 20 further has a second input receiving a threshold voltage $V_{gdon}$, of a preset value close to zero, for example 300 mV, and comprises a multiplier block 25, and a comparator block 26. The value of the threshold voltage $V_{gdon}$ is, in any case, ideally close to zero, compatibly with the precision of the comparator block 26.

The multiplier block 25 receives at its input the division voltage $V_p$, the peak value $V_{FF}$ of the same division voltage $V_p$ (generated in a per-se known manner, here not illustrated), and also a feedback signal $V_{FB}$, which is an analog voltage proportional to the power transferred from the primary winding 2a to the secondary winding 2b of the transformer 2, i.e., from the supply line 3 to the load.

In one embodiment, the value of the feedback signal $V_{FB}$ is defined on a so-called "feedback pin" of the control device 10 and is comprised between a minimum level ($V_{FB\_min}$, for example, but not necessarily, zero) and a maximum level ($V_{FB\_max}$), which correspond to the case where the power transferred is maximum or minimum (possibly zero).

The multiplier block 25 supplies at the output a discrimination voltage $V_d$, on the basis of the following expression:

$$V_d = \frac{k \cdot (V_{FB} - V_{FB\_min}) \cdot V_p}{V_{FF}}$$

where k is a corrective factor strictly less than 1, for example 0.4.

Consequently, the discrimination voltage $V_d$ is derived as a function of the value of the line voltage $V_{AC}$ (via the division voltage $V_p$) and of the factor of power transfer between the primary winding 2a and the secondary winding 2b of the transformer 2 (via the feedback signal $V_{FB}$, possibly modified by the factor $V_{FB\_min}$).

The comparator block 26 has a first input terminal that receives the aforesaid discrimination voltage $V_d$ and a second input terminal that receives the threshold voltage $V_{gdon}$.

The comparator block 26 supplies at output the discrimination signal $S_d$, as a result of the comparison between the discrimination voltage $V_d$ and the threshold voltage $V_{gdon}$.

According to one aspect of the present disclosure, in the case where the arming and triggering mechanism provided by the quasi-resonant control technique fails, the value of the discrimination signal $S_d$ enables the processing module 21 to discriminate the situation where a short circuit is present at the output, from the situation where a zero-crossing by the line voltage $V_{AC}$ occurs, or in general a condition where the input voltage $V_{in}$ reaches a zero value (or is lower than a magnetization threshold close to zero, depending upon the circuit parameters and upon the arming and triggering thresholds), thus having a value such as not to generate an appreciable magnetization of the primary winding 2a of the transformer 2.

In particular, the aforesaid condition arises if, at the end of a blanking interval $T_{blank}$ subsequent to opening of the switch element 5, the second feedback signal $V_{ZCD}$ has not armed the comparator (i.e., the value of the same second feedback signal $V_{ZCD}$ is lower than the first threshold $Th_1$). Thus, the arming signal ARM has, for example, a low logic value '0'.

In this condition, if the discrimination signal $S_d$ assumes a first value (for example, low, or logic '0'), the processing module 21 obtains an indication of the fact that the input voltage $V_{in}$ has a low value and that the line voltage $V_{AC}$ is close to a zero-crossing.

In this case, the processing module 21 immediately controls switching of the switch element 5 for minimizing distortion and maintaining a high power factor (PF) and a low total harmonic distortion (THD).

Instead, in the case where the discrimination signal $S_d$ assumes a second value (for example high, or logic '1'), the processing module 21 determines that a short circuit is present at the output. In this case, the processing module 21 waits for a given wait time before controlling switching of the switch element 5. The delay, conveniently of a long duration, thereby enables reduction of the stress on the components of the device until the short circuit condition is removed.

Basically, the processing module 21 is configured to modify the wait time before turning-on of the switch element 5 (in other words, the end of the step of energy transfer from the primary to the secondary of the transformer 2) based on the determination of the occurrence of a zero-crossing by the line voltage $V_{AC}$ (wait time of a few μs) or of a short circuit at the output (much longer wait time, even of some hundreds of μs).

A description is now made of the flow of a finite-state machine (FSM) that may be implemented by the processing module 21, for implementing the control method, according to one aspect of the present disclosure.

Figure 8:
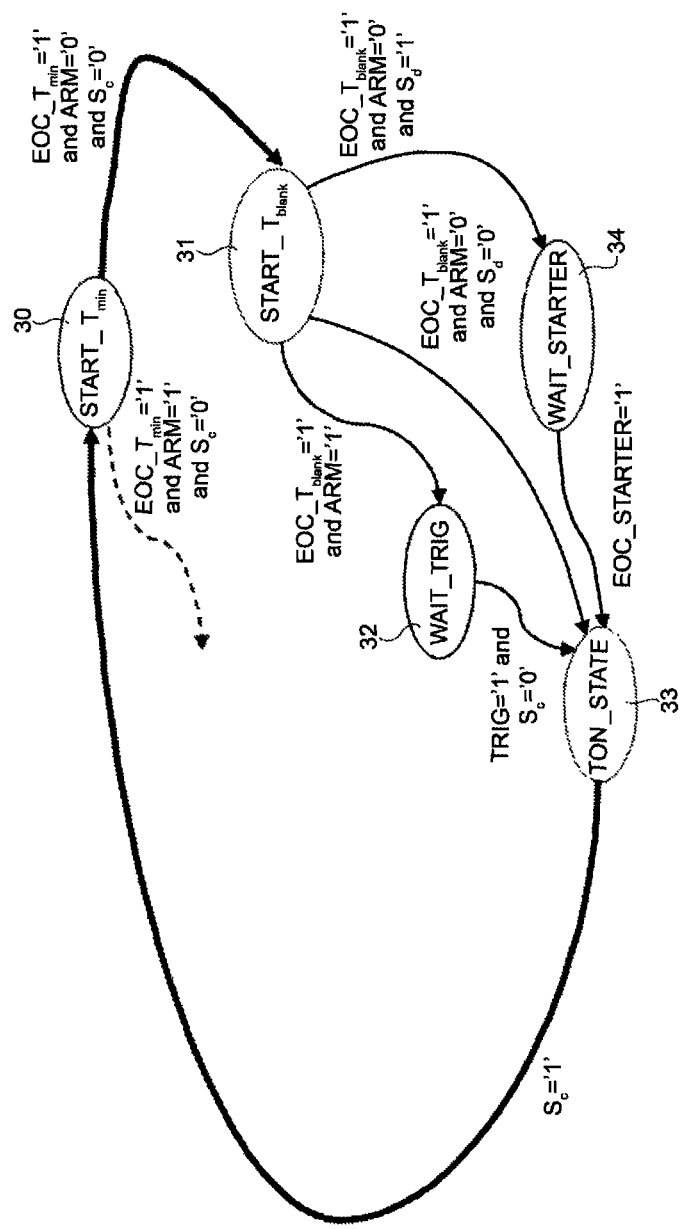
FIG. 8 is a state diagram regarding control operations performed by the control device of FIG. 6.

With reference to the diagram of FIG. 8, in a first state, designated by 30, counting is started of a minimum blanking interval $T_{min}$, of a preset value, for example 3 μs, starting from the instant of opening of the switch element 5 (indicated by switching of the control signal $S_c$).

If, at the end of the minimum blanking interval $T_{min}$ (condition EOC_$T_{min}$=1), the comparator is armed (the arming signal ARM thus has a high logic value '1', indicating the fact that the second feedback voltage $V_{ZCD}$ has exceeded the first threshold $Th_1$), the processing module 21 determines that magnetization in the transformer 2 has occurred correctly, so that it continues the quasi-resonant control operations (in a way not illustrated herein in detail and indicated by the dashed arrow; one embodiment of the corresponding control operations will be described hereinafter).

Instead, if at the end of the minimum blanking interval $T_{min}$, the comparator is not armed (the arming signal ARM thus has a low logic value '0'), the processing module 21 passes to state 31, in which counting of a variable blanking interval $T_{blank}$ is started, the value of which may advantageously be set and adjusted (in order to optimize the regulation operations), for example by a setting signal received by the control device 10.

Next, if at the end of the variable blanking interval $T_{blank}$ (condition EOC_$T_{blank}$=1) the comparator is armed (the arming signal ARM has in the example a high logic value '1'), the processing module 21 passes from state 31 to state 32, for implementation of the quasi-resonant control.

Consequently, the processing module 21 waits for triggering of the comparator, for example for the trigger signal TRIG to switch to the high logic value due to the fact that the second feedback voltage $V_{ZCD}$ drops below the second threshold $Th_2$, a condition indicating detection of a valley of the same second feedback signal $V_{ZCD}$ (as discussed in detail previously).

Next, the algorithm passes to state 33, in which the switch element 5 is closed (i.e., the corresponding MOSFET is on, ON-state of the duty cycle). At subsequent switching of the control signal $S_c$, from state 33 the processing module 21 returns to the initial state 30.

If, instead, at the end of the blanking interval $T_{blank}$, the comparator is not armed (the arming signal ARM has a low logic value '0'), two situations may arise, which correspond to determination of a zero-crossing of the line voltage $V_{AC}$ and to the presence of a short circuit at the output.

In particular, in the case where the arming signal ARM has a low logic value and further the discrimination signal $S_d$ has a low logic value, the processing module 21 determines the presence of a zero-crossing of the line voltage $V_{AC}$ and consequently immediately controls switching of the switch element 5: from state 31, the processing module 21 passes directly to state 33. In other words, a low logic value of the discrimination signal $S_d$ directly forces turning-on of the switch element 5.

Instead, in the case where the arming signal ARM has a low logic value and further the discrimination signal $S_d$ has a high logic value, the processing module 21 determines the presence of a short circuit, and consequently this means that it is required to wait for a given wait time. From state 30 the processing module 21 then passes to state 34.

In state 34, the processing module 21 waits for the end of a wait time $T_{starter}$, of a duration much longer than that of the blanking interval $T_{blank}$, that may be comprised between 400 μs and 2 ms, for example 500 μs, after which the algorithm passes once again to state 33.

Figure 9:
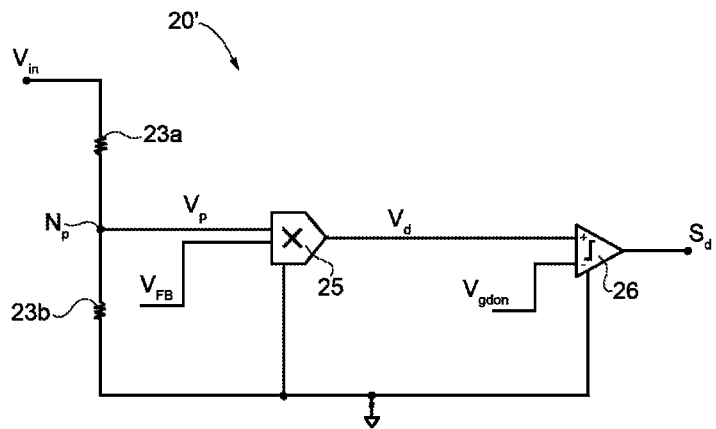
FIG. 9 shows a discrimination circuit in the control device of FIG. 6, according to a further embodiment of the present disclosure.

With reference to FIG. 9, a different embodiment of the discrimination circuit, here designated by 20', is now described.

The discrimination circuit 20' differs from the circuit 20 described with reference to FIG. 7 in that it does not envisage use, as an input of the multiplier block 25, of the peak value $V_{FF}$ of the division voltage $V_p$.

In this case, the multiplier block 25 supplies at the output a discrimination voltage $V_d$, on the basis of the following expression:

$$V_d = k \cdot (V_{FB} - V_{FB\_min}) \cdot V_p$$

where k is once again the corrective factor, strictly less than 1, for example 0.4.

The discrimination voltage $V_d$ is derived as a function of the value of the line voltage $V_{AC}$ (via the division $V_p$) and of the power transfer factor between the primary winding 2a and the secondary winding 2b of the transformer 2 (via the feedback signal $V_{FB}$).

An advantage afforded by this embodiment lies in the fact of eliminating the dependence upon the peak value $V_{FF}$.

Figure 7:
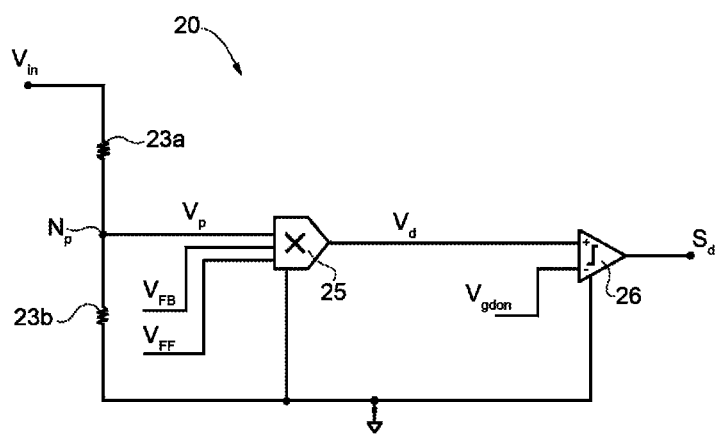
FIG. 7 shows a discrimination circuit in the control device of FIG. 6, according to one embodiment of the present disclosure.

In particular, in the circuit of FIG. 7, the comparator block 26 triggers when the input voltage $V_{in}$ satisfies the following relation:

$$V_{in} = \frac{k_p \cdot V_{gdon} \cdot V_{FF}}{k \cdot (V_{FB} - V_{FB\_min})}$$

where $K_p$ is the division ratio defined by the first and second division resistors 23a, 23b.

In the embodiment of FIG. 7, the value of the input voltage $V_{in}$ at which the discrimination signal $S_d$ switches has a direct proportionality dependence upon the peak value $V_{FF}$ of the division voltage $V_p$.

Figure 10A:
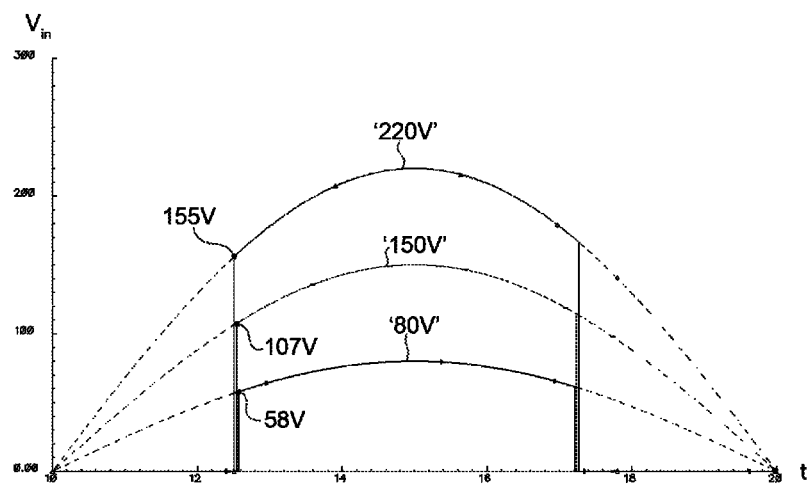
FIGS. 10A and 10B are plots of electrical quantities associated to the discrimination circuits of FIG. 7 and, respectively, of FIG. 9.

The above dependence is highlighted in FIG. 10A, which shows the result of a simulation that envisages that the input voltage $V_{in}$ is forced to zero when the discrimination signal $S_d$ switches. As it has been pointed out, as the peak value of the input voltage $V_{in}$, equal to 220 V, 150 V, or 80 V, varies, the value of the input voltage $V_{in}$ at which the aforesaid switching of the discrimination signal $S_d$ occurs, respectively equal to 155 V, 107 V, and 58 V, varies accordingly.

The circuit of FIG. 9 enables, instead, switching of the value of the discrimination signal $S_d$ irrespective of the value of the input voltage $V_{in}$, according to the expression:

$$V_{in} = \frac{K_p \cdot V_{gdon}}{k \cdot (V_{FB} - V_{FB\_min})}.$$

Figure 10B:
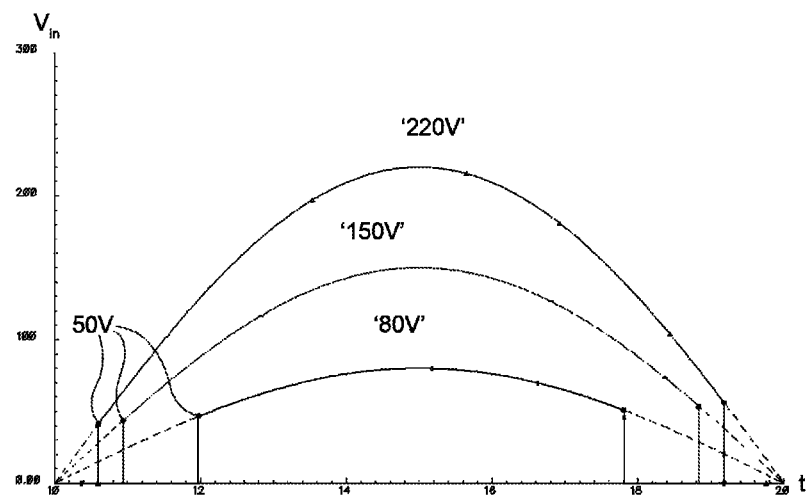

As illustrated in FIG. 10B (which corresponds to FIG. 10A), the value of the input voltage $V_{in}$ at which the discrimination signal $S_d$ switches remains the same, in the example 50 V, as the input voltage $V_{in}$ varies.

In any case, the discrimination circuits 20, 20' defines a threshold for switching of the discrimination signal $S_d$ (and consequently for the duration of the energy-transfer step), which varies dynamically as a function of the power transfer factor between the primary winding 2a and the secondary winding 2b of the transformer 2 (via the feedback signal $V_{FB}$), and, in the case of the circuit of FIG. 7, also as a function of the value of the line voltage $V_{AC}$ (via the division voltage $V_p$).

A description of a further aspect of the present disclosure is now presented, which envisages, once correct magnetization has occurred of the secondary winding 2b of the transformer 2 at the end of the minimum blanking interval $T_{min}$ (the arming signal ARM has a high logic value '1'), an appropriate management associated to the variable blanking interval $T_{blank}$, so as to ensure that the switch element 5 is closed always at a valley of the second feedback voltage $V_{ZCD}$, or, in any case, when the second feedback voltage $V_{ZCD}$ has a value close to zero, for minimizing power losses.

In particular, three different situations may arise, which will now be illustrated with reference to FIGS. 11A-11C. All these situations arise in any case after, at the end of the minimum blanking interval $T_{min}$, it has been determined that the arming signal ARM indicates that magnetization of the secondary winding 2b of the transformer 2 has occurred (i.e., it has, in the example, a high logic value '1').

Figure 11A:
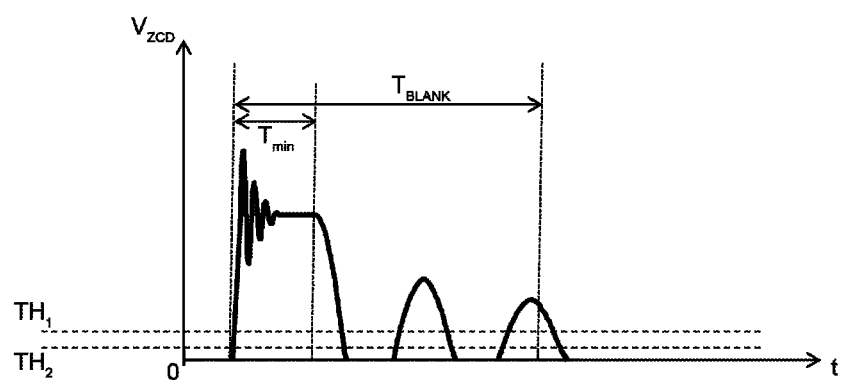
FIGS. 11A-11C are plots of electrical quantities regarding control operations carried out by the control device of FIG. 6.
Figure 11B:
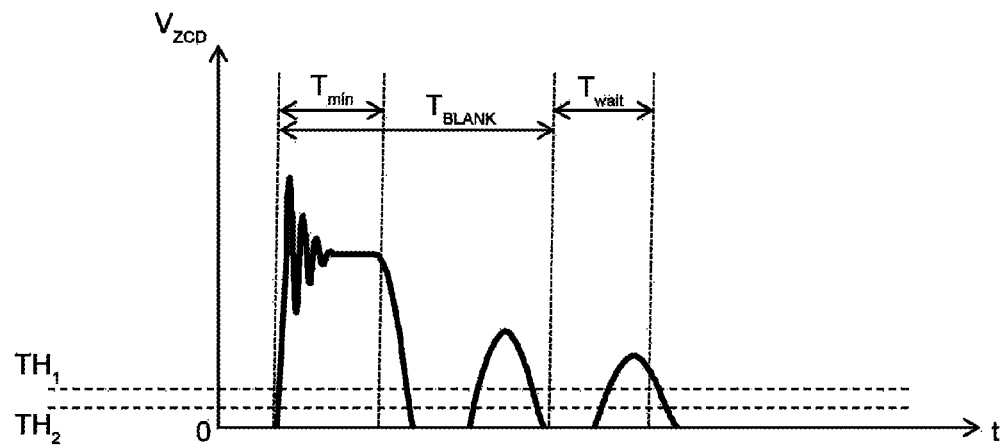

In detail, with reference to FIG. 11A (which represents, by way of example, a possible plot of the second feedback voltage $V_{ZCD}$), a first situation envisages that, at the end of the variable blanking interval $T_{blank}$, the arming signal ARM is still high.

In this case, the control solution, implemented by the processing module 21, envisages waiting for the next switching of the trigger signal TRIG, and then closing the switch element 5, in this way ensuring its switching at a valley of the second feedback signal $V_{ZCD}$.

In a second situation (illustrated in FIG. 11B), at the end of the variable blanking interval $T_{blank}$, the arming signal ARM has a low value. In this case, the solution envisages starting of the count of a further wait interval $T_{wait}$, for example equal to 3 μs (or in general comprised between 1 μs and 10 μs).

At the end of the aforesaid further wait interval $T_{wait}$, or in the case of switching of the trigger signal TRIG within the same interval (without, that is, it being necessary to wait for the end thereof), the switch element 5 is closed. If, instead, it is the arming signal ARM that switches to the high value prior to completion of the wait time $T_{wait}$, then sufficient energy is present in the system for supporting the oscillation, and consequently it is likely that a new switching of the trigger signal TRIG will be detected.

The control solution implemented by the processing module 21 then envisages waiting for the subsequent switching of the trigger signal TRIG, and, in the case where this occurs, closing of the switch element 5.

Figure 11C:
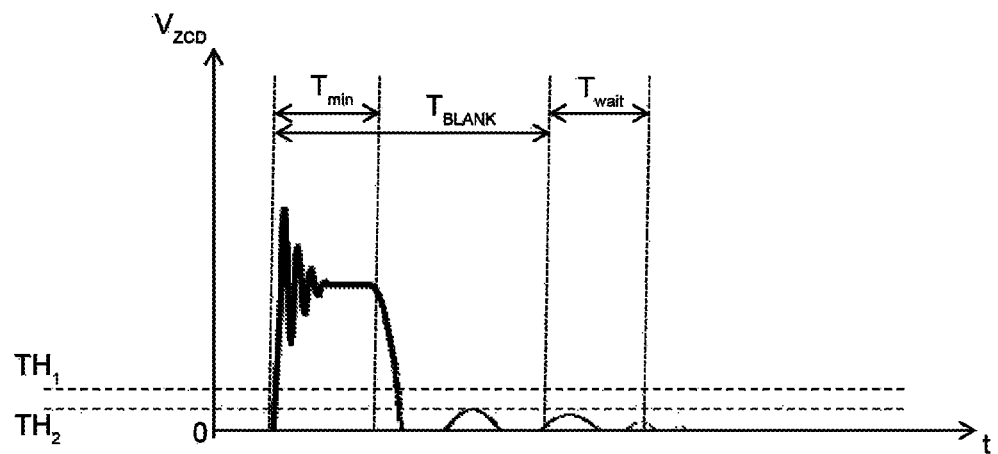

A third situation envisages, instead, as illustrated in FIG. 11C, that, at the end of the wait interval $T_{wait}$, the arming signal ARM still has a low value. In this case, it is concluded that the residual energy present in the system is not sufficient, and consequently the switch element 5 is closed immediately, in so far as there is no reason to wait any longer.

Figure 12:
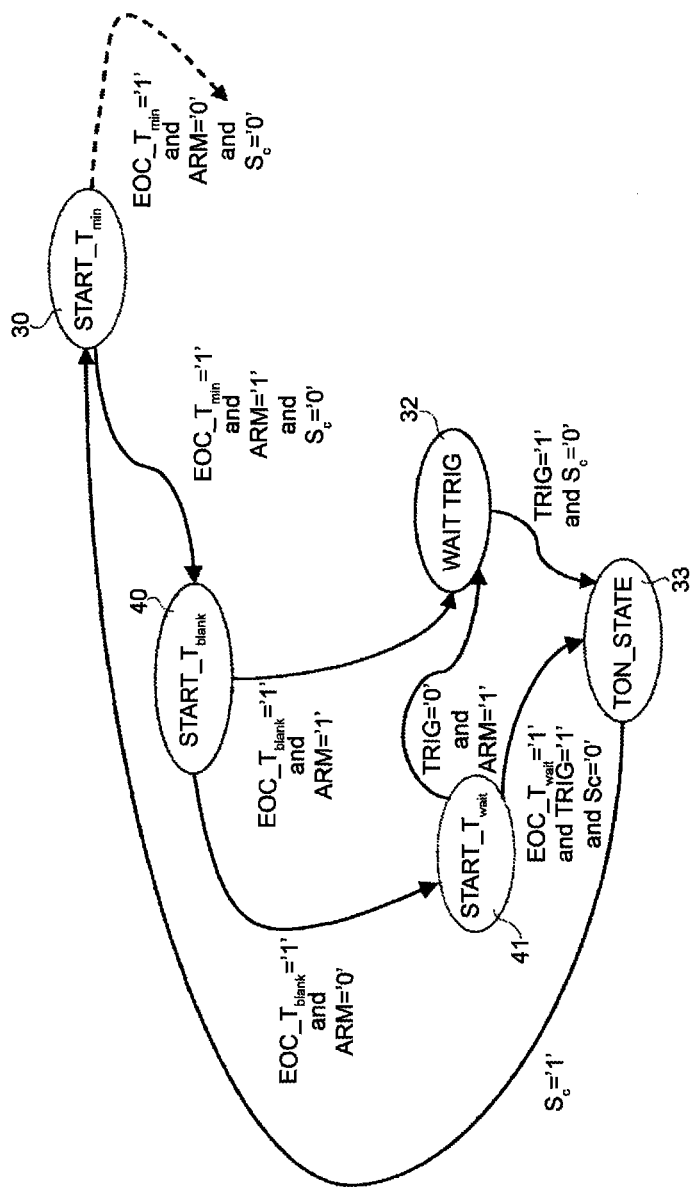
FIG. 12 is a state diagram regarding further control operations carried out by the control device of FIG. 6.

FIG. 12 sums up, in the form of a state diagram, the algorithm described previously, which is integrated with the one discussed with reference to FIG. 8. The flow starts in fact once again from the first state 30, already described with reference to FIG. 8, in which counting of the minimum blanking interval $T_m$ is started.

If, at the end of the minimum blanking interval $T_{min}$, the comparator is armed (the arming signal ARM has, in the example discussed, a high logic value '1'), the processing module 21 determines that magnetization in the transformer 2 has occurred correctly, and flow proceeds towards the state 40, where counting of the variable blanking interval $T_{blank}$ is started.

If, at the end of the variable blanking interval $T_{blank}$, the arming signal ARM has a high value (the first situation described previously), from state 40 flow proceeds to state 32, already discussed previously with reference to FIG. 8, where the processing module 21 waits for the trigger signal TRIG to switch to the high logic value. After this, flow passes to state 33, where the switch element 5 is closed (i.e., the corresponding MOSFET is ON). From state 33 flow returns to the initial state 30.

Instead, if at the end of the variable blanking interval $T_{blank}$, the arming signal ARM has a low value, from state 40 flow proceeds to state 41, where counting of the wait interval $T_{wait}$ is started.

Next, if at any instant within the wait interval $T_{wait}$ the arming signal ARM has a high value, from state 41 flow passes once again to state 32 (described previously) waiting for the trigger signal TRIG.

Otherwise, if at the end of the wait interval $T_{wait}$, the arming signal ARM still has a low value, or else if, within the same wait interval $T_{wait}$, switching of the trigger signal TRIG occurs, from state 41 flow passes directly to state 33, for closing the switch element 5.

The advantages of the proposed solutions are clear from the foregoing description.

In any case, the above solutions enable, among others, at least some of the following advantages to be obtained:

a reduction of the THD factor and an increase of the power factor (PF), thanks to the improved management of the situations of zero-crossing of the line voltage $V_{AC}$;

a greater robustness in regard to short circuits at output, which may be detected and appropriately discriminated from the aforesaid situations of zero-crossing of the line voltage $V_{AC}$;

a greater efficiency and a greater accuracy of control, in particular in managing low-load conditions, thanks to the possibility of applying an appropriate variable blanking time and to the associated effective management of the control of switching at the valleys of the feedback signal (also in the case where the aforesaid variable blanking time is particularly long).

In particular, tests and simulations have shown, in a typical operating configuration, a reduction of the THD factor by 6% and the possibility of the system to remain under control also in the case of transfer of a percentage lower than 5% of the nominal power.

The advantages outlined above also emerge clearly from a comparison of the plots of FIGS. 13A-13C with the corresponding plots of FIGS. 5A-5C, discussed previously. In particular, it is evident the marked reduction of the distortion of the waveforms that occurs at the zero-crossings of the line voltage $V_{AC}$.

Finally, it is clear that modifications and variations may be made to what has been described and illustrated herein, without thereby departing from the scope of the present disclosure.

In particular, it is clear that the circuit embodiment of the discrimination circuit 20 of the control device 10 could differ from what has been illustrated purely by way of example, as likewise could differ the expression for determination of the discrimination signal $S_d$.

It is further emphasized that, notwithstanding the fact that the foregoing description refers to a flyback converter, the present disclosure may advantageously be applied also to other types of converters, for example of the boost type, the buck-boost type, and corresponding variants thereof.

Furthermore, it is evident that the converter could be supplied also by a supply source other than the electrical line, for example also by a DC voltage, without forgoing the advantages regarding efficiency, robustness, and accuracy of regulation.

Finally, it is emphasized that the converter forming the subject of the present solutions may advantageously provide a voltage regulator or converter, to which the foregoing treatment has made explicit reference, by way of non-limiting example, or, likewise, a current regulator or converter (for instance, in LED drivers, or in battery chargers).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for controlling a switching converter, said control device comprising:
   a processing module configured to generate a control signal for controlling switching of a switch element of the switching converter on a basis of a feedback quantity for regulating an output quantity of the switching converter via alternation of a phase of storage of energy in a primary winding of the switching converter and a phase of transfer of energy from said primary winding to a secondary winding of the switching converter, the processing module further configured to control an end of the energy-transfer phase on the basis of a comparison between a value of the feedback quantity and at least one comparison threshold;
   a discrimination circuit, configured to generate a discrimination signal, a value of which is indicative of an occurrence of a first state, which indicates a short circuit on an output of the switching converter, or an occurrence of a second state in which an input quantity to the switching converter is lower that a threshold of magnetization of said primary winding; and
   wherein the processing module is further configured to control the end of said energy-transfer phase and a corresponding switching of said switch element also on the basis of said discrimination signal, and wherein said processing module, in at least one operating condition, is configured to vary a duration of a wait time, which defines the end of said energy-transfer phase, as a function of the value of said discrimination signal, between a first duration, at the occurrence of said first state, and a second duration, at the occurrence of said second state, said first duration being longer than said second duration.

2. The device according to claim 1 wherein said at least one operating condition corresponds to an operating condition in which said feedback quantity does not exceed a first comparison threshold, within a preset minimum interval starting from a start of said energy-transfer phase.

3. The device according to claim 1 wherein said discrimination circuit comprises a comparator block, configured to compare a discrimination quantity with a preset value, for generating said discrimination signal; wherein said discrimination quantity is indicative of a value of said input quantity.

4. The device according to claim 3 wherein said discrimination quantity is a function of a division of said input quantity and of a feedback quantity proportional to a power transferred from the primary winding to the secondary winding of said transformer.

5. The device according to claim 4 wherein said discrimination quantity is given by the following expression:

$$V_d = k \cdot (V_{FB} - V_{FB\_min}) \cdot V_p$$

where $V_d$ is said discrimination quantity, $V_{FB}$ is said feedback quantity proportional to the power transferred from the primary winding to the secondary winding of said transformer, $V_{FB\_min}$ is a minimum value of said feedback quantity, $V_p$ is said division of said input quantity, and k is a corrective factor.

6. The device according to claim 4 wherein said discrimination quantity is also a function of a peak value of said division of said input quantity, and is given by the following expression:

$$V_d = \frac{k \cdot (V_{FB} - V_{FB\_min}) \cdot V_p}{V_{FF}}$$

where $V_d$ is said discrimination quantity, $V_{FB}$ is said feedback quantity proportional to the power transferred from the primary winding to the secondary winding of said transformer, $V_{FB\_min}$ is a minimum value of said feedback quantity, $V_p$ is said division of said input quantity, $V_{FF}$ is said peak value of said division, and k is a corrective factor.

7. The device according to claim 1 wherein said discrimination circuit is configured to define a threshold for switching of said discrimination signal, which is dynamically variable as a function of at least one of a factor of transfer of power between the primary winding and the secondary winding of said transformer or of a value of said input quantity.

8. The device according to claim 1 wherein said processing module is configured to inhibit the comparison between the value of said feedback quantity and said at least one comparison threshold in order to control the end of said energy-transfer phase, during a blanking time interval having a variable and settable value.

9. The device according to claim 1 wherein said processing module is configured to carry out a first check, at an end of a preset minimum interval starting from a start of said energy-transfer phase, in order to verify whether the value of said feedback quantity is higher than a first comparison threshold, and, if it is, to carry out a second check, at an end of a blanking time interval having a variable and settable value starting from the start of said energy-transfer phase, on the basis of which to control the end of said energy-transfer phase.

10. The device according to claim 9 wherein the processing module is configured so as to: if, at the end of the blanking time interval, the value of the feedback quantity is higher than the first comparison threshold, control the end of said energy-transfer phase when the value of the feedback quantity subsequently drops below a second comparison threshold, lower than the first comparison threshold; if instead, at the end of the blanking time interval, the value of the feedback quantity is lower than the first comparison threshold, control the end of said energy-transfer phase if the value of the feedback quantity drops below a second comparison threshold, during a wait interval.

11. The device according to claim 10 wherein the processing module is configured to carry out a third check, at an end of said wait interval on the basis of which to control the end of said energy-transfer phase, in the case where the value of the feedback quantity does not drop below the second comparison threshold during said wait interval; wherein said third check includes: if, at the end of the wait interval, the value of the feedback quantity is higher than the first comparison threshold, determining the end of said energy-transfer phase when the value of the feedback quantity subsequently drops below the second comparison threshold; if instead, at the end of the wait interval, the value of the feedback quantity is lower than the first comparison threshold, determining the end of said energy-transfer phase immediately at the end of said wait interval.

12. A switching converter, comprising:
switching converter circuitry including a switching element and including primary and secondary energy storage elements, the switching converter circuitry configured to receive an input voltage and to provide an output voltage on an output, and further configured to provide a feedback signal based on the output voltage; and
a control circuit coupled to the switching converter circuitry, the control circuit including,
a processing module configured to generate a control signal for controlling switching of the switching element on a basis of the feedback signal to thereby regulate the output voltage through alternating phases of energy storage in the primary storage element and transfer of energy from the primary storage element to the secondary storage element, and the processing module further configured to detect the end of the transfer of energy from the primary storage element to the secondary storage element on the basis of a comparison between the value of the feedback signal and at least one comparison threshold;
a discrimination circuit configured to generate a discrimination signal having a first value indicative of a short circuit at the output of the switching converter and a second value indicating the input voltage is less than an energy storage threshold of the primary energy storage element; and
wherein the processing module is further configured to detect the end of the transfer of energy from the primary storage element to the secondary storage element and to further control the switching of the switching element on the basis of the discrimination signal.

13. The switching converter according to claim 12 wherein the switching converter circuitry comprises a quasi-resonant switching converter.

14. The switching converter according to claim 13 wherein the quasi-resonant switching converter circuitry comprises a flyback switching converter including a transformer having a primary winding forming the primary energy storage element that is configured to receive the input voltage, a secondary winding forming the secondary storage element that is configured to provide the output voltage on the output, and an auxiliary winding configured to provide the feedback signal, and wherein the switching element is coupled to the primary winding.

15. The switching converter according to claim 12 wherein the switching converter circuitry comprises one of a boost switching converter and a buck-boost switching converter.

16. A method for controlling a switching converter, the method comprising:
generating a control signal for controlling switching of a switch element on a basis of a feedback quantity for regulating an output quantity via alternation of a phase of storage of energy in a primary winding and a phase of transfer of energy from said primary winding to a secondary winding;

determining an end of said energy-transfer phase from said primary winding to said secondary winding on a basis of a comparison between a value of said feedback quantity and at least one comparison threshold;

generating a discrimination signal, having a first value of which is indicative of occurrence of a first state of a short circuit on said output, and having a second value which is indicative of the occurrence of a second state where said input quantity is lower than a magnetization threshold of said primary winding; and determining the end of said energy-transfer phase and corresponding switching of said switch element also on a basis of said discrimination signal.

17. The method according to claim 16 wherein generating said control signal comprises, in at least one operating condition, varying the duration of a wait time, which defines the end of said energy-transfer phase, as a function of the value of said discrimination signal, between a first duration, at occurrence of said first state, and a second duration, at occurrence of said second state, said first duration being longer than said second duration.

18. The method according to claim 17 wherein said at least one operating condition corresponds to an operating condition in which said feedback quantity does not exceed a first comparison threshold within a preset minimum interval starting from start of said energy-transfer phase.

19. The method according to claim 16 wherein said generating said control signal comprises carrying out a first check, at an end of a preset minimum interval starting from start of said energy-transfer phase, to verify whether the value of said feedback quantity is higher than a first comparison threshold, and, if it is, carrying out a second check, at the end of a blanking time interval having a variable and settable value starting from the start of said energy-transfer phase, on a basis of which to detect the end of said transfer phase.

* * * * *

UNITED STATES PATENT AND TRADEMARK OFFICE
CERTIFICATE OF CORRECTION

| | |
|---|---|
| PATENT NO. | : 9,948,188 B2 |
| APPLICATION NO. | : 14/829398 |
| DATED | : April 17, 2018 |
| INVENTOR(S) | : Francesco Ferrazza et al. |

Page 1 of 1

It is certified that error appears in the above-identified patent and that said Letters Patent is hereby corrected as shown below:

In the Claims

<u>Column 12, Line 35 Claim 1:</u>
"is lower that" should read, --is lower than--.

Signed and Sealed this
Thirtieth Day of October, 2018

Andrei Iancu
*Director of the United States Patent and Trademark Office*